(12) United States Patent
Fox

(10) Patent No.: US 11,912,543 B2
(45) Date of Patent: Feb. 27, 2024

(54) BOAT LIFT WITH NOISE REDUCING BEARING ASSEMBLY

(71) Applicant: Superior Gearbox Company, Stockton, MO (US)

(72) Inventor: Charles A. Fox, Stockton, MO (US)

(73) Assignee: Superior Gearbox Company, Stockton, MO (US)

( * ) Notice: Subject to any disclaimer, the term of this patent is extended or adjusted under 35 U.S.C. 154(b) by 223 days.

(21) Appl. No.: 17/325,914

(22) Filed: May 20, 2021

(65) Prior Publication Data

US 2022/0371860 A1    Nov. 24, 2022

(51) Int. Cl.
| | |
|---|---|
| *B66D 1/10* | (2006.01) |
| *B63C 3/06* | (2006.01) |
| *B66D 1/12* | (2006.01) |
| *B66D 1/14* | (2006.01) |
| *F16H 1/22* | (2006.01) |

(52) U.S. Cl.
CPC ............ *B66D 1/14* (2013.01); *B63C 3/06* (2013.01); *B66D 1/12* (2013.01); *F16H 1/225* (2013.01)

(58) Field of Classification Search
CPC .... B66D 1/14; B66D 1/12; B63C 3/06; F16H 1/225; F16H 57/021; F16H 2057/0213; F16H 57/0006
See application file for complete search history.

(56) References Cited

U.S. PATENT DOCUMENTS

| | | | | |
|---|---|---|---|---|
| 5,772,360 A | * | 6/1998 | Wood, II | B63C 3/06 254/311 |
| 5,803,437 A | | 9/1998 | Paterson et al. | |
| 6,021,692 A | * | 2/2000 | Norfolk | B63C 3/06 74/606 R |
| 6,122,994 A | * | 9/2000 | Norfolk | B63C 3/06 74/606 R |
| 6,397,691 B1 | * | 6/2002 | Greene | F16H 37/041 74/421 A |
| 6,484,655 B1 | * | 11/2002 | Gibson | B63C 3/06 114/44 |
| 7,850,147 B1 | * | 12/2010 | Fox | B66D 1/14 254/296 |
| 2007/0200104 A1 | | 8/2007 | Davis | |
| 2010/0187488 A1 | * | 7/2010 | Gargaro, III | B66D 1/12 254/362 |
| 2010/0239371 A1 | | 9/2010 | Brown | |
| 2011/0049450 A1 | | 3/2011 | Hager | |
| 2022/0355909 A1 | * | 11/2022 | Genovese | B63C 3/06 |

* cited by examiner

*Primary Examiner* — Emmanuel M Marcelo
(74) *Attorney, Agent, or Firm* — Sand, Sebolt & Wernow Co., LPA

(57) ABSTRACT

A boat lift that may have a first worm screw operably connected to the drive shaft defining an axis of rotation aligned with the drive shaft and operably contacting a first worm gear, the first worm screw and the first worm gear defines a first lifting stage. The boat lift may also have a second worm screw operably connected to the first worm gear and operably contacts a second worm gear, the second worm screw and the second worm gear defines a second lifting stage. The boat lift may have a tapered roller bearing assembly that operably engages the second worm screw, the tapered roller bearing assembly has a first tapered roller bearing secured at a first location proximate a first end of the second worm screw and a second tapered roller bearing secured at a second location proximate a second opposing end of the second worm screw.

20 Claims, 5 Drawing Sheets

BOAT LIFT WITH NOISE REDUCING BEARING ASSEMBLY

TECHNICAL FIELD

The present disclosure is generally directed to a vehicle hoist. More particularly, the present disclosure is generally directed to a boat lift with worm drives. Specifically, the present disclosure is directed to a boat lift assembly with two worm drives and a tapered roller bearing assembly for reducing mechanical noise caused during the operation of the boat lift.

BACKGROUND

Generally, a boat lift is a device and/or an apparatus that lifts a boat from a body of water to provide maintenance, repair, and/or storage of said boat. In order to lift a boat from a body of water, boat lifts generally include one or more drive assemblies for raising and lowering the boat from and into the body of water. The size and configuration of the boat lift and the number of drive assemblies operably connected to the boat lift may vary depending on the size, weight, and configuration of the types of boats the boat lift will be used for raising and lowering a boat from and into the body of water.

In some instances, current drive assemblies on boat lifts that raise and lower boats from and into the body of water may incur wear or damage depending on the mechanical configuration of the drive assembly. In other instances, the drive assemblies on boat lifts that raise and lower the boat from and into the body of water may incur wear or damage based on the environment in which the boat lift and the drive assemblies are located (e.g., in close proximity to a body of water with excess moisture, the amount of load exerted on the gears during a lifting operation, etc.). As such, the wear and damage of current drive assemblies may cause unnecessary consequences that could hinder the performance of the drive assembly. Such wear and damage of current drive assemblies tend to cause mechanical noise when using and operating the drive assemblies.

SUMMARY

The presently disclosed boat lift provides a user with capability of raising and lowering a wide range of boats and/or watercraft by using a first worm drive and a second worm drive that includes a tapered roller bearing assembly. The disclosed boat lift may reduce the mechanical noise caused by the boat lift during operation due to the inclusion of the tapered roller bearing assembly being used on the second worm drive. As such, the boat lift disclosed herein addresses some of the issues with previously known boat lifts that fail to include a tapered roller bearing assembly.

In one aspect, an exemplary embodiment of the present disclosure may provide a boat lift. The boat lift may include a drive motor that has a drive shaft. The boat lift may include a first worm screw that is operably connected to the drive shaft and defines an axis of rotation aligned with the drive shaft, the first worm screw operably contacts a first worm gear, the first worm screw and the first worm gear defines a first lifting stage. The boat lift may include a second worm screw that is operably connected to the first worm gear and operably contacts a second worm gear, the second worm screw and the second worm gear defines a second lifting stage. The boat lift may include a spool that is operably connected to the second worm wheel and a cable disposed about the spool for lifting a boat, the spool defines the third lifting stage. The boat lift may include a tapered roller bearing assembly that is operably engaged with the second worm screw for reducing mechanical noise during rotation of the second worm screw.

This exemplary embodiment or another exemplary embodiment may further provide that the tapered roller assembly bearing further comprises a first tapered roller bearing secured at a first location proximate to a first end of the second worm screw; and a second tapered roller bearing secured at a second location proximate to a second opposing end of the second worm screw. This exemplary embodiment or another exemplary embodiment may further provide that the first tapered roller bearing and the second tapered roller bearing face one another on the second worm screw. This exemplary embodiment or another exemplary embodiment may further provide that each of the first tapered roller bearing and the second tapered roller bearing is in linear contact with the second worm screw. This exemplary embodiment or another exemplary embodiment may further provide that the first tapered roller bearing and the second tapered roller bearing provide equal rolling torque to the second worm screw. This exemplary embodiment or another exemplary embodiment may further provide that the drive motor is operable to drive the first lifting stage, the first lifting stage is operable to drive the second lifting stage, and the second lifting stage is operable to drive the third lifting stage. This exemplary embodiment or another exemplary embodiment may further provide that an interior chamber is defined in the first worm screw that extends from a first end of the first worm screw towards a second opposing end of the first worm screw; and wherein the drive shaft is disposed inside of the interior chamber to operably connect to the first worm screw. This exemplary embodiment or another exemplary embodiment may further provide that the first worm gear is circumferentially disposed about the second worm screw at a first end of the second worm screw. This exemplary embodiment or another exemplary embodiment may further provide that the first worm gear defines a first diameter and the second worm gear defines a second diameter that is greater than the first diameter. This exemplary embodiment or another exemplary embodiment may further provide that the second worm gear further comprises a plurality of holes defined through the second worm gear. This exemplary embodiment or another exemplary embodiment may further provide that boat lift further comprises a key disposed between the first worm gear and the second worm screw to operably connect the first worm gear to the second worm screw. This exemplary embodiment or another exemplary embodiment may further provide that that boat lift further comprises a housing that houses each of the first worm screw, the second worm screw, the first worm gear, and the second worm gear. This exemplary embodiment or another exemplary embodiment may further provide that the second worm gear further comprises a hub. This exemplary embodiment or another exemplary embodiment may further provide that the boat lift further comprises a drive tube inside the hub and attached thereto by a first fastener. This exemplary embodiment or another exemplary embodiment may further provide that the boat lift further comprises a second fastener that secures the hub adjacent to the spool. This exemplary embodiment or another exemplary embodiment may further provide that the second worm screw is formed of a copper alloy. This exemplary embodiment or another exemplary embodiment may further provide that the boat lift further comprises a first access opening defined in the housing that provides access to the first worm screw and the first worm gear inside of the housing; and a second access opening defined in the housing that provides access to the second worm screw and the second worm gear inside of the housing. This exemplary embodiment or another exemplary embodiment may further provide that the cable further comprises a first end attached to a fixed point remote from the hoist; and a second opposing end attached to the spool; wherein the cable is wound about the spool when the spool is driven by the second lifting stage. This exemplary embodiment or another exemplary embodiment may further provide that the first lifting stage is oriented orthogonal to the second lifting stage; and wherein the third lifting stage is oriented orthogonal to the second lifting stage wherein the first lifting stage and the third lifting stage are parallel to one another. This exemplary embodiment or another exemplary embodiment may further provide that the tapered rolling bearing assembly is pre-loaded to the second worm screw.

In another aspect, an exemplary embodiment of the present disclosure may provide a boat lift. The boat lift may have a drive motor that has a drive shaft. The boat may have a first worm screw operably connected to the drive shaft and defines an axis of rotation aligned with the drive shaft, the first worm screw operably contacts a first worm gear, the first worm screw and the first worm gear defines a first lifting stage. The boat lift may have a second worm screw operably connected to the first worm gear and operably contacts a second worm gear, the second worm screw and the second worm gear defines a second lifting stage. The boat lift may have a tapered roller bearing assembly that operably engages the second worm screw, the tapered roller bearing assembly has a first tapered roller bearing secured at a first location proximate a first end of the second worm screw and a second tapered roller bearing secured at a second location proximate a second opposing end of the second worm screw, wherein the first tapered roller bearing and the second tapered rolling bearing face one another on the second worm screw and provide equal rolling torque to the second worm screw. The boat lift may have a spool operably connected to the second worm wheel and a cable disposed about the spool for lifting a boat, the spool defines the third lifting stage. The tapered roller bearing assembly operably engages the second worm screw for reducing mechanical noise during rotation of the second worm screw.

In yet another aspect, an exemplary embodiment of the present disclosure may provide a method The method comprises the step of operably engaging a first end of a cable to a boat; rotating a first lifting stage of a boat lift with a drive motor; rotating a second lifting stage of the boat lift by the rotation of the first lifting stage; rotating a third lifting stage of the boat lift by the rotation of the second lifting stage; winding the cable around a spool of the third lifting stage; lifting the boat from a body of water with the cable; and reducing mechanical noise of the second lifting stage by a tapered roller bearing assembly provided with the second lifting stage. This exemplary embodiment or another exemplary embodiment may further provide a step of engaging a first end of a cable to a boat cradle wherein the boat is provided with the boat cradle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The following detailed description and the attached drawings describe and illustrate a boat lift. The description and drawings are provided to enable one skilled in the art to make and use one or more boat lifts. They are not intended to limit the scope of the claims in any manner.

Figure 1:
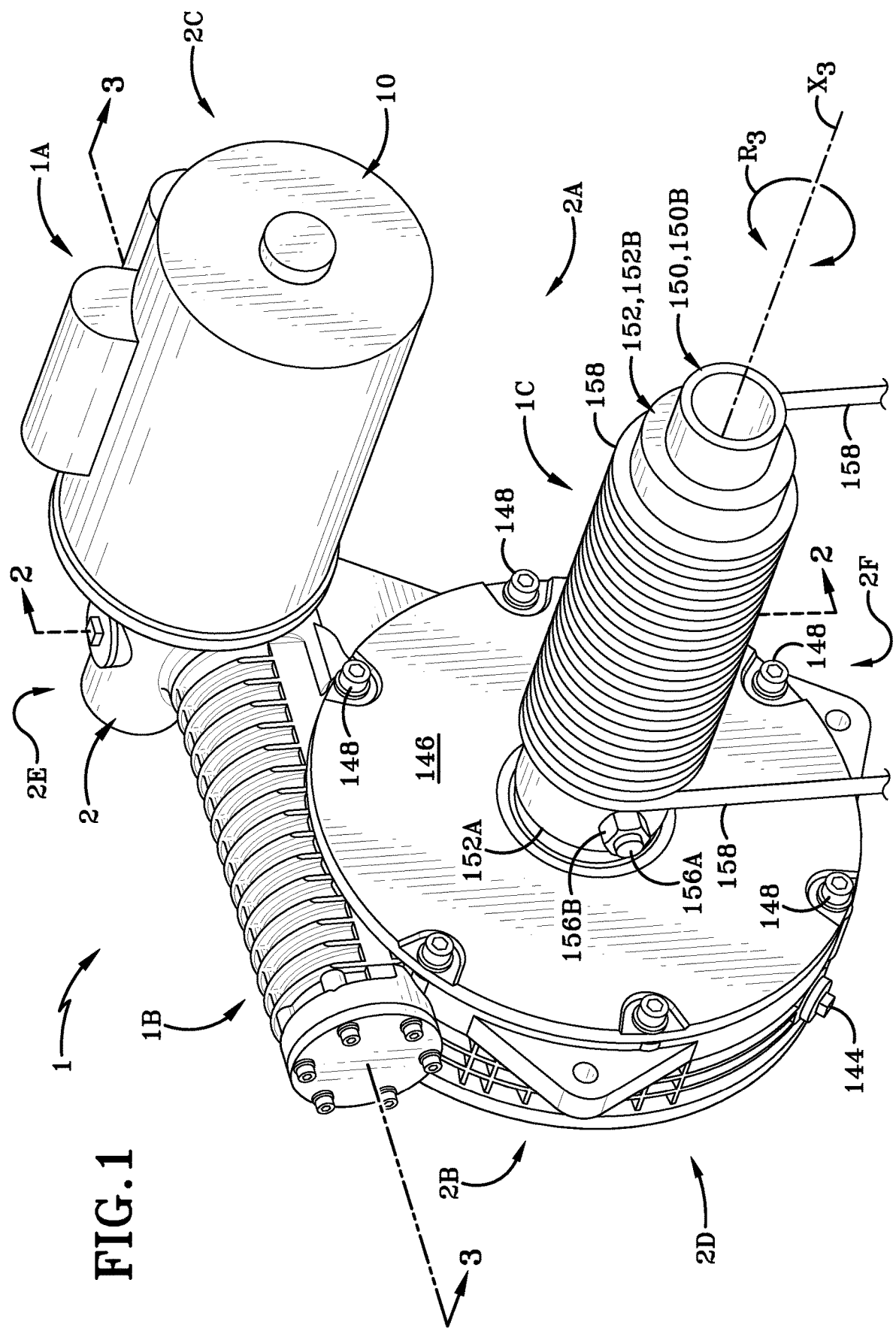
FIG. 1 is a top, front, right side isometric perspective view of a boat lift in accordance with an aspect of the present disclosure.

As illustrated in FIG. 1, the boat lift, generally referenced as 1, includes a first lifting stage (generally referenced as 1A), a second lifting stage (generally referenced as 1B), and a third lifting stage (generally referenced as 1C) for lifting types of boats and/or watercrafts from a body of water. It should be understood that any suitable type of boat and/or watercraft may be lifted from a body of water by at least one boat lift, such as boat lift 1, as determined and/or desired by a user of said boat lift 1. Examples of boats and/or watercrafts that may be lifted by at least one boat lift described and illustrated herein includes fishing boats, dinghy boats, deck boats, bowrider boats, catamaran boats, center console boats, houseboats, trawler boats, motor yacht boats, personal watercraft (PWC) boats, ski boats, pontoon boats, ferries, barges, and other types of boats and/or watercraft or the like.

Referring to FIG. 1, a portion of the first lifting stage 1A, the second lifting stage 1B, and a portion of the third lifting stage 1C are provided inside of a housing 2. As illustrated in FIG. 1, the housing 2 includes a front end 2A, a rear end 2B that opposes the front end 2A, a left side 2C, a right side 2D that opposes the left side 2C, a top end 2E, and a bottom end 2F that opposes the top end 2E. The housing 2 is considered advantageous at least because the housing 2 provides safety protection to a user of the boat lift 1 while also protecting the associated components of the first lifting stage 1A, the second lifting stage 1B, and the third lifting stage 1C from the exterior elements disposed about the boat lift 1 (e.g., moisture, dirt, etc.).

Figure 2:
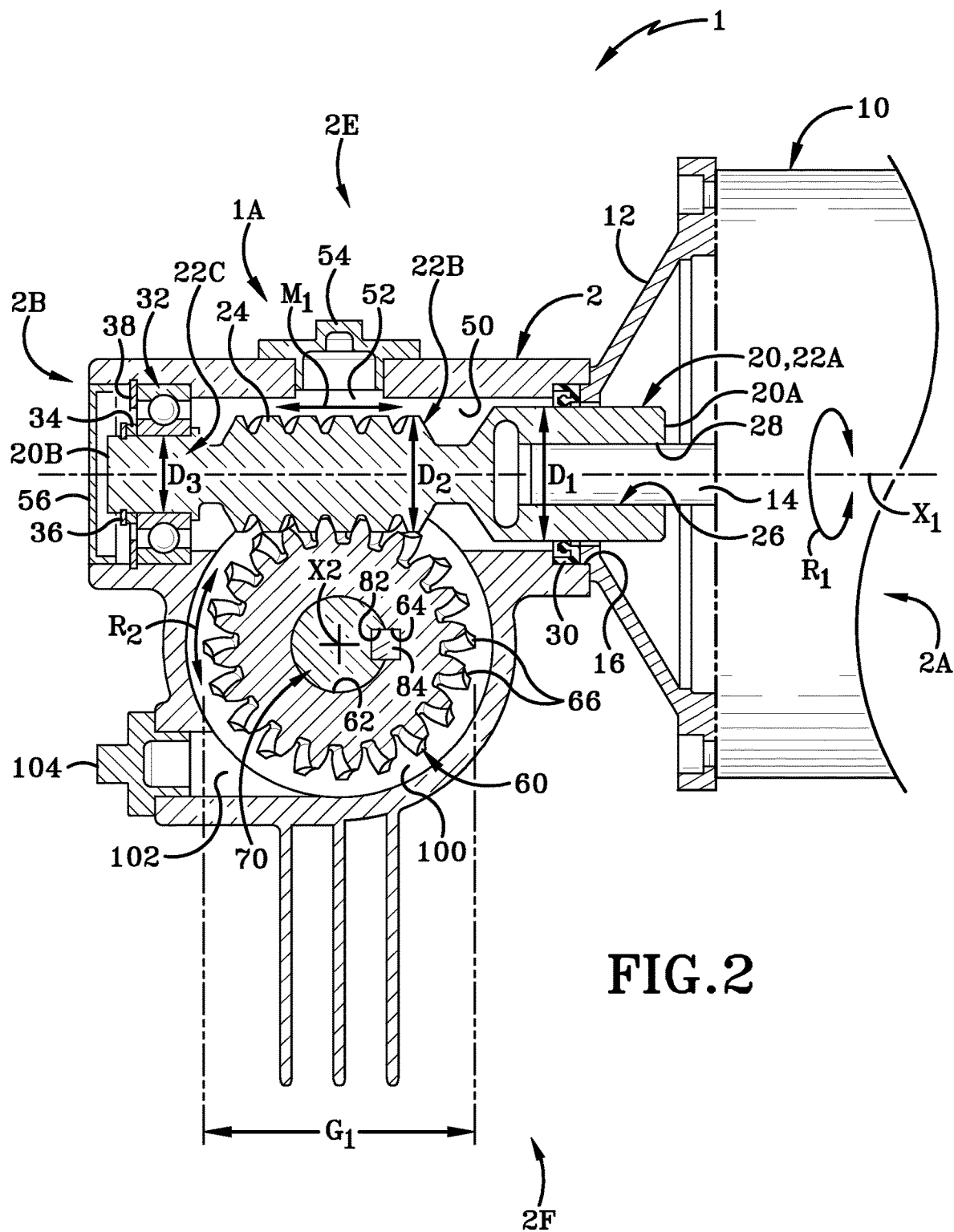
FIG. 2 is a vertical cross-sectional view of a first lifting stage of the boat lift looking in the direction of line 2-2 of FIG. 1.

Referring to FIGS. 1 and 2, the boat lift 1 includes a drive motor 10. The drive motor 10 has a motor adaptor 12 that is connected to the housing 2 due to the drive motor 10 being disposed exterior to the housing 2. As illustrated in FIG. 2, the drive motor 10 also has a drive shaft 14 that operably connects to the drive motor 10 and extends from the driver motor 10 into the housing 2 through a first opening 16 defined by the housing 2. The driver motor 10 provides the mechanical power of operating the first, second, and third lifting stages 1A, 1B, 1C for lifting a boat from a body of water, which is described in further detail below.

Referring to FIG. 2, the first lifting stage 1A of boat lift 1 includes a first worm screw 20. The first worm screw 20 includes a first end 20A disposed proximate the front end 2A of the housing 2 and a second opposing end 20B disposed proximate the rear end 2B of the housing 2. The first worm screw 20 includes a first portion 22A that extends from first end 20A towards the second end 20B and defines a first diameter $D_1$. The first worm screw 20 also includes a second portion 22B that extends from the first portion 22A towards the second end 20B and defines a second diameter $D_2$. The first worm screw 20 also includes a third portion 22C that extends from the second portion 22B to the second end 20B and defines a third diameter $D_3$. The third diameter $D_3$ is greater than the first diameter $D_1$ and the second diameter $D_2$. In addition, the second portion 22B includes a first set of teeth 24 that extends circumferentially from a portion of the second portion 22B and is disposed between the first and third portions 22A, 22C. The operation of the first set of teeth 24 of the boat lift 1 is described in more detail below.

Still referring to FIG. 2, the first worm screw 20 also defines a chamber 26 that extends from an aperture 28 at the first end 20A of the first worm screw 20 towards the second end 20B of the first worm screw 20. The chamber 26 is sized and configured to receive and house a portion of the drive shaft 14 such that the drive shaft 14 operably connects to the first worm screw 20. Such connection between the drive shaft 14 and the first worm screw 20 allows the drive motor 10 to transfer torque to the first worm screw 20 to provide lifting power to the first lifting stage 1A and use the boat lift 1 to lift a boat from a body of water. Such transfer of torque from the drive motor 10 to the first worm screw 20 is described in more detail below.

Still referring to FIG. 2, the first worm screw 20 is maintained inside of the housing 2 by a first seal 30 disposed on the first portion 22A proximate to the first end 20A of the first worm screw 20. In the illustrated embodiment, the seal 30 provides support to the first end 20A of the first worm screw 20 while still allowing the first worm screw 20 to rotate during operation of the boat lift 1. In addition, the first worm screw 20 is maintained inside of the housing 2 by a first bearing 32 positioned on the third portion 22C proximate to the second end 20B of the first worm screw 20. In one exemplary embodiment, the first bearing 32 may be a ball bearing. In another exemplary embodiment, the first bearing 32 may be any suitable bearing that one of ordinary skill in the art would use in a particular embodiment. The first worm screw 20 is also maintained inside of the housing 2 via an internal retaining ring 34 and an external retaining ring 36 disposed closer to the second end 20B of the first worm screw than the first bearing 34. A first washer 38 may also be disposed on the third portion of the first worm screw 20 between the internal retaining ring 36 and the first bearing 34. The first bearing 32, the internal retaining ring 34, the external retaining ring, and the washer 38 allows the first worm screw 20 to rotate about a first axis of rotation "$X_1$" defined between the first and second ends 20A, 20B of the first worm screw 20 inside of the housing 2, via torque applied by drive motor 10 to the drive shaft 14, while maintaining the lateral position of the first worm screw 20 during operation. Such rotation of the first worm screw 20 via the drive motor 10 is described in more detail below.

Still referring to FIG. 2, the housing 2 defines a first bore 50 that extends from the first opening 16 to the rear end 2A of the housing 2. The first bore 50 houses a portion of the drive shaft 14 of the drive motor 10, a portion of the first worm drive 20, and other associated components that hold and maintain the first worm drive 20 inside of the housing 2. In addition, the housing 2 defines a first access opening 52 proximate the top end 2E of the housing 2. The first access opening 52 provides access to the first bore 50 for maintenance and service purposes inside of the first bore 50 and the first lifting stage 1A of the boat lift 1. The first access opening 52 is enclosed via a first plug 54 to prevent any external elements from entering into the first bore 50 via the first access opening 52. In addition, an endcap 56 is disposed inside of the first bore 50 at the rear end 2B of the housing 2. The endcap 56 encloses the first bore 50 at the rear end 2B of the housing 2 to prevent any external elements from entering into the housing 2.

Figure 3:
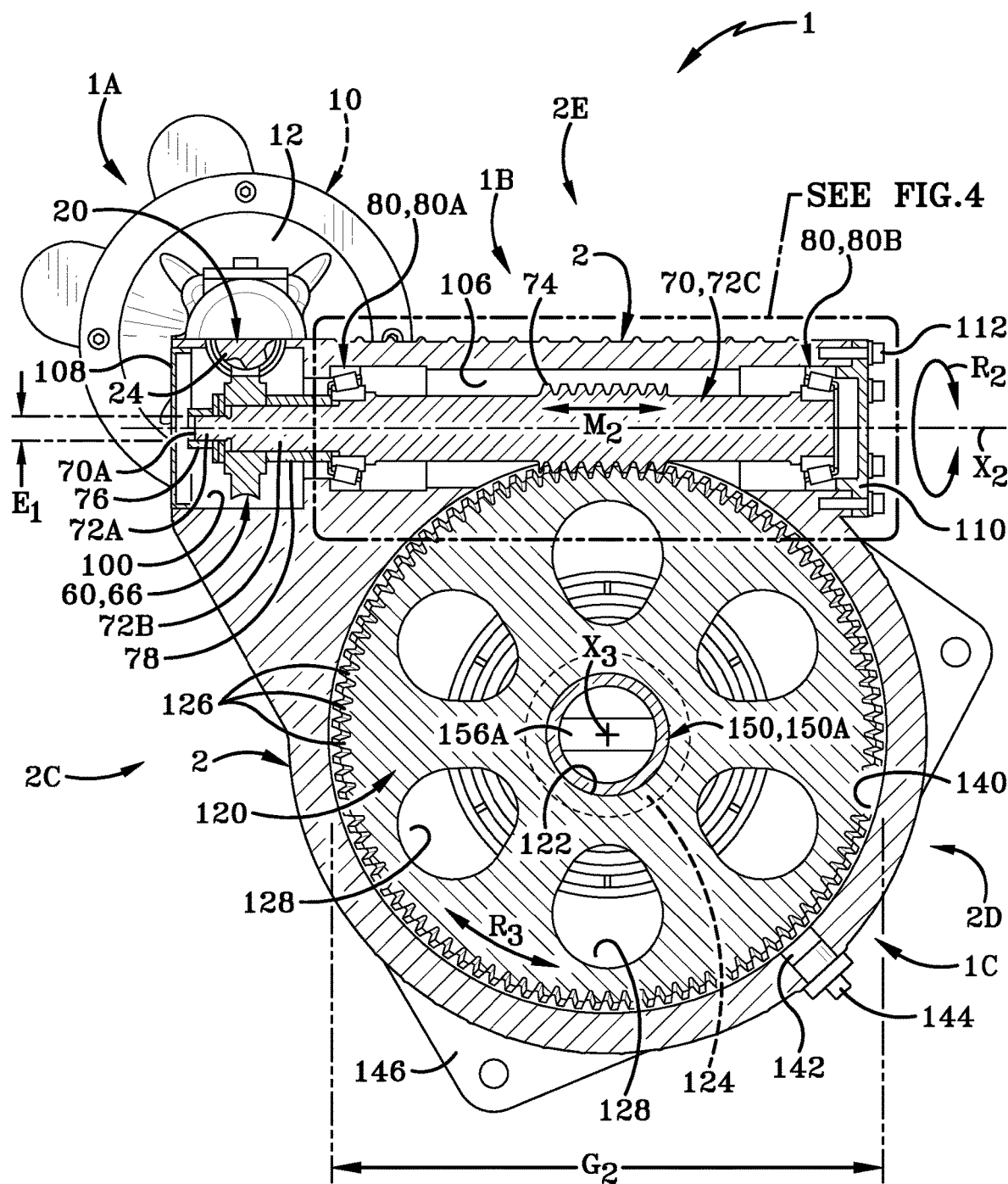
FIG. 3 is a longitudinal cross-sectional view of second and third lifting stages of the boat lift looking in the direction of line 3-3 of FIG. 1.

Referring to FIGS. 2 and 3, the first lifting stage 1A includes a first worm gear 60. The first worm gear 60 defines a central opening 62 that extends entirely through the first worm gear 60 orthogonal to the length of the first worm screw 20. The first worm gear 60 also defines a first notch 64 that extends longitudinally from the central opening 62 towards the outermost edge of the first worm gear 60. In the illustrated embodiment, the central opening 62 and the first notch 64 may be of different shapes. In one exemplary embodiment, the central opening 62 may be substantially circular, and the first notch 64 may be substantially rectangular. The first worm gear 60 includes a second set of teeth 66 that radially extends away from the first worm gear 60 on the outermost edge of said first worm gear 60. As illustrated in FIG. 2, the second set of teeth 66 operably meshes with the first set of teeth 24 on the first worm screw 20 where first worm screw 20 rotates the first worm gear 60 on a second axis of rotation "$X_2$" during operation. As illustrated, the second axis of rotation "$X_2$" extends transversely through the first worm gear 60 and is orthogonal to the first axis of rotation "$X_1$" defined by the drive shaft 14 and the first worm screw 20. Such rotation of the first worm gear 60 caused by the first worm screw 20 is described in more detail below.

Figure 4:
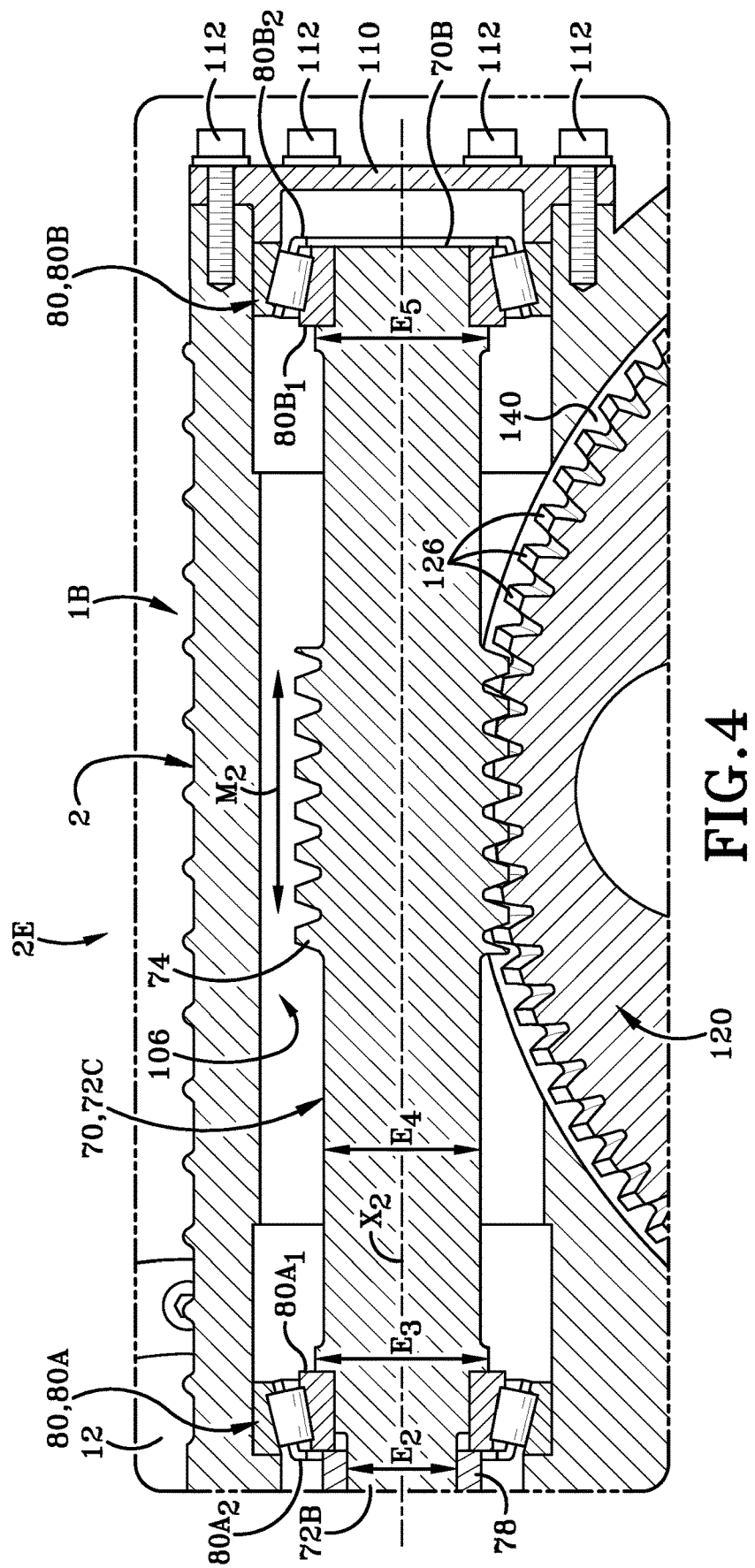
FIG. 4 is an enlarged view of the highlighted region of FIG. 3.

Referring to FIGS. 2 through 4, the second lifting stage 1B of the boat lift 1 includes a second worm screw 70 similar to the first worm screw 20, except as detailed below. The second worm screw 70 includes a first end 70A disposed proximate the left side 2C of the housing 2 and a second opposing end 70B disposed proximate the second end 2D of the housing 2. The second worm screw 70 includes a first portion 72A that extends from first end 70A towards the second end 70B and defines a first diameter $E_1$. The second worm screw 70 also includes a second portion 72B that extends from first portion 72A towards the second end 70B and defines a second diameter $E_2$. The second worm screw 70 also includes a third portion 72C that extends from second portion 72B to the second end 70B and defines a third diameter $E_3$ proximate to the second portion 72B, a fourth diameter $E_4$ at the second end 70B of the second worm screw 70, and a fifth diameter $E_5$ defined along the third portion 72C. The third and fifth diameters $E_3$, $E_5$ are equal to each other and are greater than the first, second and fourth diameters $E_1$, $E_2$, $E_4$ of the second worm screw 70. The third portion 72C includes a third set of teeth 74 that extends circumferentially away from the second worm screw 70 on a portion of the third portion 72C between the second portion 72B and the second end 70B of the second worm screw 70. Such use and interaction of the third set of teeth 74 is described in more detail below.

Referring to FIGS. 3 and 4, the second worm screw 70 is maintained inside of the housing 2 where the first portion 72A of the second worm screw 70 operably engaging a nut 76 at the first end 70A of the second worm screw 70. As such, the nut 76 provides securement to the first end 70A of the second worm screw 70 during operation of the boat lift 1. In addition, the second worm screw 70 is maintained inside of the housing 2 by a spacer 78 positioned on the second portion 72B of the second worm screw 70 proximate to the third portion 72C of the second worm screw 70. The nut 76 and the spacer 78 allows the second worm screw 70 to rotate about the second axis of rotation "$X_2$" defined between the first and second ends 70A, 70B of the second worm screw 70 inside of the housing 2, via torque applied by the first worm gear 60, while maintaining the lateral position of the second worm screw 70 during operation.

Still referring to FIGS. 3 and 4, the second worm screw 70 is also maintained inside of the housing 2 via a tapered roller bearing assembly 80. In the illustrated embodiment, the tapered roller bearing assembly 80 includes a first tapered roller bearing 80A and a second tapered roller bearing 80B. Each of the first tapered roller bearing 80A and the second tapered roller bearing 80B is positioned on the third portion 72C of the second worm screw 70. As illustrated in FIGS. 3 and 4, the first tapered roller bearing 80A is disposed on third portion 72C (defining the third diameter $E_3$) of the second worm screw 70 proximate the second portion 72B of the second worm screw 70. The second tapered roller bearing 80B is also disposed on the third portion 72C (defining the fifth diameter $E_5$) of the second worm screw 70, but is proximate the second end 70B of the second worm screw 70. In the illustrated embodiment, the first tapered roller bearing 80A and the second tapered roller bearing 80B oppose one another on the second worm screw 70. As illustrated in FIG. 4, the first tapered roller bearing 80A and the second tapered roller bearing 80B face one another due to a front end $80A_1$ of the first tapered roller bearing 80A being oriented at a front end $80B_1$ of the second tapered roller bearing 80B on the second worm screw 70. In addition, a rear end $80A_2$ of the first tapered roller bearing 80A faces an opposing direction as compared to a rear end $80B_2$ of the second tapered roller bearing 80B. Operation of the tapered roller bearing assembly 80 and the second worm screw 70 is described in more detail below.

Referring to FIGS. 2 and 3, the second worm screw 70 defines an indentation 82 that extends from the outermost edge of the second worm 70 towards the center of the second worm screw 70. The indentation 82 is defined in the second portion 72B, proximate the first end 70A, and extends transversely towards the third portion 72C of the second worm screw 70. The indentation 82 is substantially rectangular-shaped similar to the rectangular-shaped notch 64 defined by the first worm gear 60. As illustrated in FIG. 2, a key 84 is sized and configured to be received by the first worm gear 60 and the second worm screw 70 via the notch 64 defined by the first worm gear 60 and the indentation 82 defined by the second worm gear 70. In the illustrated embodiment, the key 84 creates a linkage between the first worm gear 60 and the second worm screw 70 to allow the first worm gear 60 to transfer torque to the second worm screw 70 during operation of the boat lift 1 for rotating the second worm screw 70 along the second axis of rotation "$X_2$". Such transfer of torque and rotation between the first worm gear 60 and the second worm screw 70 is described in more detail below.

Referring to FIGS. 2 and 3, the housing 2 defines a second bore 100 that extends vertically from the left side 2C of the housing 2 to the right side 2D of the housing 2 in which the second bore 100 is orthogonal to the first bore 50. In addition, the second bore 100 is in fluid communication with the first bore 50 where a portion of the first worm screw 20 is disposed inside of the second bore 100 (i.e., the first set of teeth seen 24 in FIG. 2). In addition, the second bore 100 houses the first worm gear 60, a portion of the second worm screw 70 (e.g., the first portion 72A and second portion 72B), and certain associated parts that hold and maintain the first worm gear 60 and the second worm drive 70 inside of the housing 2. Referring to FIG. 2, the housing 2 also defines a second access opening 102 proximate the rear end 2B and the bottom end 2E of the housing 2. The second access opening 102 provides access to the second bore 100 for maintenance and service purposes inside of the second bore 100 and the first and second lifting stages 1A, 1B of the boat lift 1. The second access opening 102 is enclosed via a second plug 104 to prevent any external elements from entering into the second bore 100 via the second access opening 102. Referring to FIGS. 3 and 4, the housing 2 also defines a third bore 106 that extends transversely from the second bore 100 to the front end 2B of the housing 2 in which the third bore 106 is parallel to the second bore 100. The third bore 106 houses a portion of the second worm screw 70 (e.g., the second portion 72B and third portion 72C), and certain associated parts that hold and maintain the second worm gear 70 inside of the housing 2.

As illustrated in FIG. 3, a stopper 108 is provided at the rear end 2B of the housing 2 where the stopper 108 is disposed inside of the second bore 100 and operably engages the housing 2. The stopper 108 encloses the second bore 100 to prevent external elements from entering into the second bore 100. Still referring to FIG. 3, a cover 110 is provided at the front end 2A of the housing where the cover 110 is disposed over and inside of the third bore 106. The cover 110 encloses the third bore 106 to prevent external elements from entering into the third bore 106. In one exemplary embodiment, a set of fasteners 112 may operably fasten the cover 110 to the housing 2 to maintain the position of the cover 110 over the third bore 106. In another exemplary embodiment, other suitable ways of operably engaging the cover 110 to the housing 2 to maintain the position of the cover 110 over and inside of the third bore 106 may be used for a particular embodiment.

Referring to FIG. 3, the second lifting stage 2A includes a second worm gear 120. The second worm gear 120 defines a central opening 122 that extends longitudinally through the second worm gear 120. As illustrated in FIGS. 1 and 3, the second worm gear 120 has a hub 124 that is disposed inside of the central opening 122. The hub 124 has a first end 124A that is disposed proximate the rear end 2B of the housing 2, and a second opposing end 124B that is disposed proximate the front end 2A of the housing 2. The hub 124 of the second worm gear 120 longitudinally extends from the first end 124A to the second end 124B in which a portion of the hub 124 is disposed exterior to the housing 2. In the illustrated embodiment, the central opening 122 and the hub 124 may be of similar shapes. In one exemplary embodiment, the central opening 122 and the hub 124 may be substantially circular.

The second worm gear 120 includes a fourth set of teeth 126 that radially extends away from the second worm gear 120 on the outermost edge of said second worm gear 120. As illustrated in FIGS. 3 and 4, the fourth set of teeth 126 of the second worm gear 120 operably meshes with the third set of teeth 74 of the second worm screw 70 where second worm screw 70 is able to rotate the second worm gear 120 on a third axis of rotation "$X_3$" (shown in FIG. 4). The third axis of rotation "$X_3$" is defined from the first end 124A of the hub 124 to the second end 124B of the hub and is orthogonal to the second axis of rotation "$X_2$" defined by the first worm gear 60 and the second worm screw 70. Such rotation of the second worm gear 120 via the second worm screw 70 is described in more detail below. In addition, the second worm gear 120 defines a set of through-holes 128 that extends entirely through the second worm gear 120. The set of through-holes 128 reduces the overall weight of the second worm gear 120. Furthermore, the second worm gear 120 defines a second gear diameter $G_2$, which is greater than the first gear diameter $G_1$ of the first worm gear 60. Such difference in gear diameters allows the boat lift 1 to operate at different speeds at the first worm gear 60 and the second worm gear 120 in order to lift boats and/or watercrafts of different weights from a body of water.

Referring to FIG. 3, the housing 2 defines a fourth bore 140 that extends longitudinally from the rear end 2B of the housing 2 to the front end 2A of the housing 2 in which the fourth bore 140 is orthogonal to the third bore 106. In addition, the fourth bore 140 is in fluid communication with the third bore 106 where a portion of the second worm screw 70 is disposed inside of the fourth bore 140 (i.e., the third set of teeth 74 seen in FIGS. 3 and 4). The fourth bore 140 houses a portion of the second worm screw 70, the second worm gear 120, and certain associated parts that hold and maintain the second worm gear 120 inside of the housing 2. The housing 2 also defines a third access opening 142 proximate the right side 2D and the bottom end 2E of the housing 2. The second access opening 142 provides access to the fourth bore 140 for maintenance and service purposes inside of the fourth bore 140 for the second and the third lifting stages 1B, 1C of the boat lift 1. The second access opening 142 is enclosed via a third plug 144 to prevent any external elements from entering into the fourth bore 140 via the third access opening 142. As illustrated in FIG. 1, a shroud 146 operably engages the front end 2A of the housing 2 where the shroud 146 covers the second worm gear 120. The covering of the second worm gear 120 via the shroud 146 protects the second worm gear 120 from exterior elements surrounding the boat lift 1. The shroud 146 is operably engaged to the housing 2 via a set of fasteners 148 operably fastening the shroud 146 to the housing 2.

Referring to FIGS. 1 and 3, the third lifting stage 1C includes a drive tube 150. The drive tube 150 includes a first end 150A that is disposed proximate the rear end 2A of the housing 2 and a second opposing end 150B disposed exterior of the housing 2 proximate the front end 2A of the housing 2. In addition, the third lifting stage 1C includes a spool 152. The spool 152 includes a first end 152A that is disposed proximate to the front end 2A of the housing 2 and the shroud 146 and a second opposing end 152B proximate the second end 150B of the drive tube 150. The spool 152 defines a central passageway 153 that longitudinally extends between the first end 152A and the second end 152B. The central passageway 152 is sized and configured to receive and house a portion of the drive tube 150.

Still referring to FIGS. 1 and 3, the drive tube 150 and the spool 152 independently attach to the hub 124 of the second worm gear 120. As illustrated in FIG. 3, the drive tube 150 operably engages the hub 124, via a first fastener 154, proximate the first end 124A of the hub 124 and the first end 150A of the drive tube 152A. As illustrated in FIG. 1, the spool 152 operably engages the hub 124, via a second fastener 156A and a nut 156B, proximate the second end 124B of the hub 124 and the first end 152A of the spool 152. Such engagement between the hub 124 and each of the drive tube 150 and spool 152 allows the second worm gear 120 to transfer torque to the drive tube 150 and spool 152. As such, the drive tube 150 and the spool 152 rotate and share the third axis of rotation "$X_3$" with the second worm gear 120. Such operation of the second worm gear 120 with the drive tube 150 and the spool 152 are described in more detail below. In addition, a cable 158 is provided on the spool 152 for operably attaching the boat lift 1 to a boat cradle and/or similar devices for lifting a boat from a body of water. In an exemplary embodiment, one end of the cable 158 may be operably fixed to a boat cradle and/or similar device for lifting a boat from a body of water, and another end of the cable 158 may be operably fixed at a location on the spool 152 to wind and unwind the cable 158 during operation. In another exemplary embodiment, one end of the cable 158 may be operably fixed to the boat itself for lifting the boat from a body of water, and another end of the cable 158 may be operably fixed at a location on the spool 152 to wind and unwind the cable 158 during operation. In the illustrated embodiment, any suitable spool 152 may be used with the boat lift 1 for lifting a boat.

In the illustrated embodiment, the spool 152 is disposed adjacent to the hub 124 in boat lift 1. In one exemplary embodiment, a portion of a spool may be disposed inside of a hub in a boat lift. In another exemplary embodiment, a spool may be disposed on the hub in a boat lift.

Having described the boat lift 1 and its associated lifting stages with associated parts and components, a method of using the boat lift 1 will now be described in further detail below.

Prior to operating the boat lift 1, one end of the cable 158 is operably connected to a boat cradle and/or similar device for lifting a boat out of a body of water. During such process, more than one boat lift, such as boat lift 1, may be used collectively for lifting said boat from the body of water. Once the one end of the cable 158 of at least one boat lift 1 is attached to the boat cradle and/or similar device, a user may operate the at least one boat lift for lifting a boat out of a body of water. It will be understood that more than one boat lift, such as boat lift 1, may operate in a substantially identical way when lifting a boat out of a body of water. As described below, the operation of a single boat lift 1 will be discussed in further detail below.

The user of the boat lift 1 operably controls the boat lift 1 via the drive motor 10. The user of the boat lift 1 may operably control the boat lift 1 via the drive motor 10 in any suitable manner. In one exemplary embodiment, the drive motor 10 may be electrically connected to a motor controller in which the user operably controls the power of the drive motor 10 and the rotation of the drive motor 10 applied to the drive shaft 14 for lifting a boat from a body of water. Once the user applies a first command to the driver motor 10 for lifting the boat from the body of water, the drive motor 10 applies a first torque to the drive shaft 14 where the drive shaft 14 rotates in a first direction about the first axis of rotation "$X_1$". Such first direction of rotation is denoted by arrow labeled "$R_1$" shown in FIG. 2. As such, the rotation applied to the drive shaft 14 via the driver motor 10 begins the first lifting stage 1A of the boat lift 1.

As the drive motor 10 applies the first torque to the drive shaft 14, the drive shaft 14 transfers the first torque to the first worm screw 20 due to the drive shaft 14 being operably engaged with the first worm screw 20 (as described above). As such, the first worm screw 20 also rotates in the first direction about the first axis of rotation "$X_1$" due to the drive shaft 14 and the first worm screw 20 sharing an axis of rotation in boat lift 1. As such, the first worm screw 20 rotates about the first axis of rotation "$X_1$" while directly contacting the seal 30 and the first bearing 32. The seal 30 and the first bearing 32 maintains the position of the first worm screw 20 inside of the first bore 50 of the housing 2 while still allowing the first worm screw 20 to rotate about itself. The internal retaining ring 34 and the external retaining ring 36 also maintain position of the first worm screw 20 at the first end 20A of the first worm screw 20.

Upon rotation of the first worm screw 20, first worm screw 20 rotates the first worm gear 60 via the first set of teeth 24 on the first worm screw 20 being operably meshed with the second set of teeth 66 on the first worm gear 60. In boat lift 1, the first worm screw 20 applies a second torque to the first worm gear 60 by linearly sliding over the first worm gear 60 causing the first worm gear 60 to rotate in a second direction about the second axis of rotation "$X_2$". The linear movement of the first worm screw 20 is denoted by arrow labeled "$M_1$" (shown in FIG. 2), and the rotational movement of the first worm gear 60 is denoted arrow labeled "$R_2$" (shown in FIGS. 2 and 3).

As the first worm screw 20 applies the second torque to the first worm gear 60, the first worm gear 60 transfers the second torque to the second worm screw 70 due to the second worm screw 70 being operably engaged with the first worm gear 60 via the key 84. The second worm screw 70 also rotates in the second direction about the second axis of rotation "$X_2$" due to the first worm gear 60 and the second worm screw 70 sharing an axis of rotation in boat lift 1. As such, the second worm screw 70 rotates about the second axis of rotation "$X_2$" while directly contacting the first tapered roller bearing 80A and the second tapered roller bearing 80B of the tapered roller bearing assembly 80. Each of the first tapered roller bearing 80A and the second tapered roller bearing 80B maintains the position of the second worm screw 70 inside of the third bore 50 of the housing 2 while still allowing the second worm screw 70 to rotate about itself. Such advantages of using the tapered roller bearing assembly 80 over other types of bearing assemblies are described in more detail below.

Upon rotation of the second worm screw 70, the second worm screw 70 rotates the second worm gear 120 via the third set of teeth 74 on the second worm screw 70 being operably meshed with the fourth set of 126 on the second worm gear 120. In boat lift 1, the second worm screw 70 applies a third torque to the second worm gear 120 by linearly sliding over the second worm gear 120 causing the second worm gear 120 to rotate in a third direction about the third axis of rotation "$X_3$". The linear movement of the second worm screw 70 is denoted by arrow labeled "$M_2$" (shown in FIG. 3), and the rotational movement of the first worm gear 60 is denoted arrow labeled "$R_3$" (shown in FIG. 3).

As the second worm screw 70 applies the third torque to the second worm gear 120, the second worm gear 120 transfers the third torque to the drive tube 150 and the spool 152 due to the drive tube 150 and the spool 152 being operably engaged with the second worm gear 120 via the hub 124. As such, the drive tube 150 and the spool 152 collectively rotate in the third direction about the third axis of rotation "$X_3$" due to the drive tube 150 and the spool 152 collectively sharing an axis of rotation with the second worm gear 120 in boat lift 1 (shown in FIG. 1). Such collective rotation of the drive tube 150 and the spool 152 winds the cable 158 around the spool 152 between the first end 152A and the second end 152A of said spool 152 for lifting the boat from the body of water via the one end of the cable 158 being attached to the boat cradle and/or similar device.

Once the user has determined a suitable height for which the boat has been lifted from the body of water, the user may stop operating boat lift 1 thus ending all movement caused by the drive motor 10. Once movement has ceased, the boat lift 1 will maintain the boat at the determined height due to the orientation and configuration of each of the first set of teeth 24, second set of teeth 66, third set of teeth 74, and fourth set of teeth 126 provided on the first worm screw 20, first worm gear 60, second worm screw 70, and second worm gear 120. In other words, the orientation and the configuration of the gearing in boat lift 1 includes a self-stopping mechanism that prevents the slipping or "backing-up" of the gears in the boat lift 1 while holding the boat in the air and out of the body of water. As such, the drive motor 10 is simply turned off and does not need to apply a reverse torque to maintain the boat when lifted from the body of water.

If, however, the user desires to lower the boat from the lifted position and back into the body of water, the user may operably control the drive motor 10 to apply a reverse torque to the drive shaft 14 that is opposite to the first torque applied to the drive shaft 14 for lifting the boat from the body of water. As such, the reverse torque applied by the drive motor 10 will reverse the rotation directions of the first lifting stage 1A, the second lifting stage 1B, and the third lifting stage 1C to cause boat lift 1 to lower the boat from the lifted position and back into the body of water. As such, the cable 158 of boat lift 1 will unwind from the spool 152 causing the boat lift to collectively lower the boat cradle and/or similar device and the boat from the lifted position and back into the body of water.

During operation of boat lift 1, the first worm gear 60 and the second worm gear 120 rotate at different speeds when lifting or lowering a boat into the body of water. As such, the first worm gear 60 may rotate at a greater speed than the second worm gear 120 due to the differences in diameter between the first worm gear 60 and the second worm gear 120 (the gear diameter $G_2$ of the second worm gear is greater than the gear diameter $G_1$ of the first worm gear). Such difference in speed and diameter of the first worm gear 60 and the second worm gear 120 is considered advantageous at least because the boat lift 1 may use a smaller, less powerful drive motor, such as drive motor 10, for lifting a wide range of boats from a body of water while still applying suitable torque to the first, second, and third lifting stages 1A, 1B, 1C.

The inclusion of the tapered roller bearing assembly 80 in boat lift 1 is considered advantageous at least because the tapered roller bearing assembly 80 reduces the overall mechanical noise of the boat lift 1 when lifting and/or lowering a boat from and/or into a body of water. A combination of the first and second roller tapered bearings 80A, 80B allows for an increase in rolling torque applied to the second worm screw 70 as compared to other combinations of bearings (e.g., ball bearings). Such increase of rolling torque is accomplished due to each of first and second tapered roller bearings 80A, 80B providing a greater surface area of rolling at each end of the second worm screw 70. As such, the increase in rolling torque is equally applied at each end of the second worm screw 70 when the second worm screw 70 is being rotated, via the first worm gear 60, and when the second worm screw 70 applies rotation to the second worm gear 120. The increase in rolling torque applied to the second worm screw 70, in turn, reduces the overall mechanical noise of the first, second, and third lifting stages 1A, 1B, 1C during a lifting or lowering operation.

Furthermore, the inclusion of the tapered roller bearing assembly 80 operably engaging the second worm screw 70 is considered advantageous at least because the tapered roller bearing assembly 80 provides greater durability and longevity as compared to other combinations of bearings. Such increase in durability and longevity is created due to the linearly contact of the first tapered roller bearing 80A and the second tapered roller bearing 80B on the second work screw 70. As illustrated in FIGS. 3 and 4, each roller provided on each of the first and second tapered roller bearings 80A, 80B provides a greater amount of contact surface between the bearings 80A, 80B and the second worm screw 70 when the second worm screw 70 is rotating during operation. The greater amount of contact between the bearings 80A, 80B and the second worm screw 70 reduces wear and damage to the bearings 80A, 80B as compared to using different bearings provided on each end of the second worm screw 70. In other words, the greater amount of contact between the bearings 80A, 80B and the second worm screw 70 spans the contact area across the bearings 80A, 80B and the second worm screw 70 for preventing greater wear spots and/or damage on the bearings 80A, 80B and/or the second worm screw 70 during operation of the boat lift 1.

In the illustrated embodiment, each tapered roller bearing 80A, 80B of the tapered roller bearing assembly 80 may operably engage and/be pre-loaded to the second worm 70 in any suitable technique or method. In one exemplary embodiment, each tapered roller bearing in a tapered roller bearing assembly may be operably engaged and/or pre-loaded to a second worm gear through shimming. In this exemplary embodiment, a thin piece of material may be positioned between each tapered roller bearing and the second worm gear to ensure that the tapered roller bearings and the second worm gear are sufficiently even with one another so that the tapered roller bearings may provide suitable rotational support to the second worm gear for reducing mechanical noise during operation. In another exemplary embodiment, each tapered roller bearing in a tapered roller bearing assembly may be operably engaged and/or pre-loaded to a second worm gear through machining. In this exemplary embodiment, each tapered roller bearing may have a substantially similar dimension to the second worm gear so that each tapered roller bearing may provide suitable rotational support to the second worm gear for reducing mechanical noise during operation.

While a single boat lift 1 is discussed for lifting a boat from a body of water, any suitable amount of boat lifts may be used to lift and/or lower a boat from and/or into a body of water. Examples of suitable numbers of boat lifts for lifting and/or lowering a boat from and/or into a body of water include one, at least one, two, a plurality, three, four, five, six, and other suitable numbers of boat lifts for lifting and/or lowering a boat from and/or into a body of water.

In the illustrated embodiment, the first worm screw 20 that includes the first set of teeth 24 may be made of any suitable material. In one exemplary embodiment, a first worm screw that includes a first set of teeth may be made of a metal alloy, more particularly a copper alloy. In another exemplary embodiment, a first worm gear that includes a first set of teeth may be made of bronze. In addition, the first worm gear 60 that includes the second set of teeth 66 may be made of any suitable material. In one exemplary embodiment, a first worm gear that includes a second set of teeth may be made of a metal alloy, more particularly a copper alloy. In another exemplary embodiment, a first worm gear that includes a second set of teeth may be made of bronze. Furthermore, the second worm screw that includes the third set of teeth 74 may be made of any suitable material. In one exemplary embodiment, a second worm screw that includes a third set of teeth may be made of a metal alloy, more particularly a copper alloy. In another exemplary embodiment, a second worm gear that includes a third set of teeth may be made of bronze. The use of copper alloy, such as a bronze, with associated parts and/or components in the boat lift 1 is considered advantageous at least because the use of such copper alloy provides a better drive quality between the first and second lifting stages 1A, 1B during lifting operations.

Figure 5:
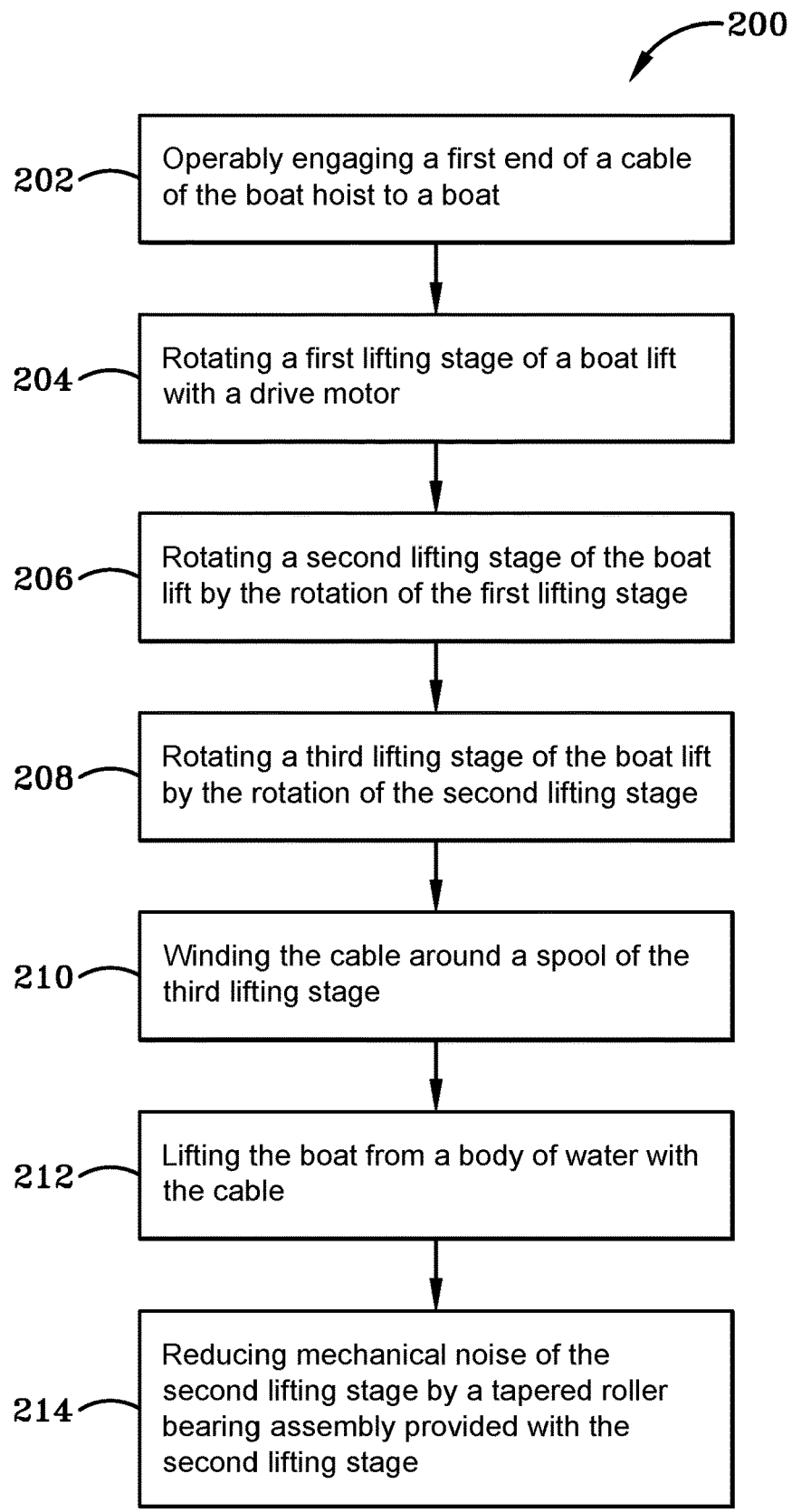
FIG. 5 is an exemplary method flow chart for lifting a boat via a boat lift.

FIG. 5 illustrates a method 200. The initial step 202 of method 200 comprises operably engaging a first end of a cable to a boat. Another step 204 comprises rotating a first lifting stage of a boat lift with a drive motor. Another step 206 comprises rotating a second lifting stage of the boat lift by the rotation of the first lifting stage. Another step 208 comprises rotating a third lifting stage of the boat lift by the rotation of the second lifting stage. Another step 210 comprises winding the cable around a spool of the third lifting stage. Another step 212 comprises lifting the boat from a body of water with the cable. Another step 214 comprises reducing mechanical noise of the second lifting stage by a tapered roller bearing assembly provided with the second lifting stage.

In an exemplary embodiment, method 200 may include additional steps of lifting a boat via a boat lift 1. The step of applying a first torque, via the drive shaft, to a first lifting stage of the boat lift may further comprise that the first lifting stage has a first worm screw; wherein the drive shaft applies the first torque to the first worm screw. The step of applying a second torque, via the first lifting stage shaft, to a second lifting stage of the boat lift may further comprise that the second lifting stage has a first worm gear and a second worm screw; wherein the first worm screw applies the first torque to the first worm gear, and the first worm gear applies the second torque to the second worm gear. The step of applying a third torque, via the second lifting stage shaft, to a third lifting stage of the boat lift may further comprise that the third lifting stage has a second worm gear, a drive tube, and a spool; wherein the second worm screw applies the third torque to the second worm gear, the drive tube, and the spool. An optional step may include the step of holding the boat at a predetermined height due to the self-locking configuration of the boat lift; this optional step may be provided after step 210. Another optional step may include the step of lowering the boat from the predetermined height to the body of water; this optional step may be provided after step 210. Another optional step may include the step of engaging a first end of a cable to a boat cradle wherein the boat is provided with the boat cradle.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment,"

"an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0. % of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A boat lift, comprising:
a drive motor having a drive shaft;
a first worm screw operably connected to the drive shaft and defining an axis of rotation aligned with the drive shaft, the first worm screw including a first worm gear, the first worm screw and the first worm gear defining a first lifting stage;
a second worm screw operably connected to the first worm gear and including a second worm gear, the second worm screw and the second worm gear defining a second lifting stage adapted to engage to a spool defining a third lifting stage; and
a tapered roller bearing assembly operably engaged with the second worm screw for reducing mechanical noise during rotation of the second worm screw; the tapered roller bearing assembly comprises:
a first tapered roller bearing secured at a first location proximate a first end of the second worm screw and provides support between the first lifting stage and the second lifting stage; and
a second tapered roller bearing secured at a second location proximate a second end of the second worm screw opposite to the first end and provides support between the second lifting stage and the third lifting stage;
wherein the first tapered roller bearing and the second tapered rolling bearing face one another on the second worm screw and provide equal rolling torque to the second worm screw.

2. The boat lift of claim 1, wherein the tapered roller assembly bearing further comprises:
a first tapered roller bearing secured at a first location proximate to a first end of the second worm screw; and
a second tapered roller bearing secured at a second location proximate to a second opposing end of the second worm screw.

3. The boat lift of claim 2, wherein the first tapered roller bearing and the second tapered roller bearing face one another on the second worm screw.

4. The boat lift of claim 2, wherein each of the first tapered roller bearing and the second tapered roller bearing is in linear contact with the second worm screw.

5. The boat lift of claim 2, wherein the first tapered roller bearing and the second tapered roller bearing provide equal rolling torque to the second worm screw.

6. The boat lift of claim 1, wherein the drive motor is operable to drive the first lifting stage, the first lifting stage is operable to drive the second lifting stage, and the second lifting stage is operable to drive the third lifting stage.

7. The boat lift of claim 1, further comprising:
an interior chamber defined in the first worm screw that extends from a first end of the first worm screw towards a second opposing end of the first worm screw; and
wherein the drive shaft is disposed inside of the interior chamber to operably connect to the first worm screw.

8. The boat lift of claim 1, wherein the first worm gear is circumferentially disposed about the second worm screw at a first end of the second worm screw.

9. The boat lift of claim 1, wherein the first worm gear defines a first diameter and the second worm gear defines a second diameter that is greater than the first diameter.

10. The boat lift of claim 1, further comprising:
a cable disposed about the spool for lifting a boat.

11. The boat lift of claim 1, further comprising:
a key disposed between the first worm gear and the second worm screw to operably connect the first worm gear to the second worm screw.

12. The boat lift of claim 11, further comprising;
a hub provided on the second worm gear;
a drive tube inside the hub and attached thereto by a first fastener; and
a second fastener secures the hub adjacent to the spool.

13. The boat lift of claim 1, wherein the tapered rolling bearing assembly is pre-loaded to the second worm screw.

14. The boat lift of claim 1, further comprising:
a housing containing each of the first worm screw, the second worm screw, the first worm gear, and the second worm gear.

15. The boat lift of claim 14, further comprising:
a first access opening defined in the housing that provides access to the first worm screw and the first worm gear inside of the housing; and a second access opening defined in the housing that provides access to the second worm screw and the second worm gear inside of the housing.

16. The boat lift of claim 1, wherein the second worm screw is formed of a copper alloy.

17. The boat lift of claim 10, wherein the cable further comprises:
    a first end attached to a fixed point remote from the spool; and
    a second opposing end attached to the spool; wherein a cable is wound about the spool when the spool is driven by the second lifting stage.

18. The boat lift of claim 1, wherein the first lifting stage is oriented orthogonal to the second lifting stage; and
    wherein the third lifting stage is oriented orthogonal to the second lifting stage wherein the first lifting stage and the third lifting stage are parallel to one another.

19. A boat lift, comprising:
    a drive motor having a drive shaft;
    a first worm screw operably connected to the drive shaft and defining an axis of rotation aligned with the drive shaft, the first worm screw including a first worm gear, the first worm screw and the first worm gear defining a first lifting stage;
    a second worm screw operably connected to the first worm gear and including a second worm gear, the second worm screw and the second worm gear defining a second lifting stage;
    a tapered roller bearing assembly operably engaging the second worm screw, the tapered roller bearing assembly having a first tapered roller bearing secured at a first location proximate a first end of the second worm screw and provides support between the first lifting stage and the second lifting stage, and a second tapered roller bearing secured at a second location proximate a second opposing end of the second worm screw and provides support between the second lifting stage and the third lifting stage, wherein the first tapered roller bearing and the second tapered rolling bearing face one another on the second worm screw and provide equal rolling torque to the second worm screw; and
    a spool operably connected to the second worm wheel and a cable disposed about the spool for lifting a boat, the spool defining the third lifting stage;
    wherein the tapered roller bearing assembly operably engages the second worm screw for reducing mechanical noise during rotation of the second worm screw.

20. A method comprising:
    operably engaging a first end of a cable to a boat;
    rotating a first worm screw and a first worm gear with the drive motor, wherein the first worm screw and the first worm gear define a first lifting stage of a boat lift;
    rotating a second worm screw and a second worm gear by the first lifting stage, wherein the second worm screw and the second worm gear define a second lifting stage of the boat lift;
    supporting the second worm screw, by a first tapered roller bearing of a tapered roller bearing assembly, at a first end;
    supporting the second worm screw, by a second tapered roller bearing of the tapered roller bearing assembly, at a second end opposite to the first end facing the first tapered roller bearing;
    rotating a third lifting stage of the boat lift by the rotation of the second lifting stage;
    winding the cable around a spool of the third lifting stage;
    lifting the boat from a body of water with the cable; and
    reducing mechanical noise of the second lifting stage by the tapered roller bearing assembly provided with the second lifting stage.

* * * * *